(12) United States Patent
Vom Stein

(10) Patent No.: US 8,434,628 B2
(45) Date of Patent: May 7, 2013

(54) COVER WITH INTEGRAL SEAL

(75) Inventor: Hans-Joachim Vom Stein, Odenthal (DE)

(73) Assignee: Aktiebolaget SKF, Göteborg (SE)

( * ) Notice: Subject to any disclaimer, the term of this patent is extended or adjusted under 35 U.S.C. 154(b) by 712 days.

(21) Appl. No.: 12/589,067

(22) Filed: Oct. 16, 2009

(65) Prior Publication Data

US 2010/0108597 A1 May 6, 2010

(30) Foreign Application Priority Data

Oct. 17, 2008 (DE) .......... 10 2008 051 856

(51) Int. Cl.
B01D 35/30 (2006.01)
F16J 15/02 (2006.01)

(52) U.S. Cl.
USPC ............ 210/435; 210/450; 277/644; 277/647

(58) Field of Classification Search .......... 123/509–516; 210/172.1, 172.2, 172.4, 232, 429, 435, 445, 210/446, 450, 451, 416.4; 277/590, 616, 277/628, 644, 647
See application file for complete search history.

(56) References Cited

U.S. PATENT DOCUMENTS

| | | | | |
|---|---|---|---|---|
| 4,379,051 A | * | 4/1983 | Hiesinger et al. | ............. 210/193 |
| 4,933,093 A | * | 6/1990 | Keller | ............. 210/774 |
| 5,273,193 A | * | 12/1993 | Murakami et al. | ....... 222/189.06 |
| 5,415,146 A | * | 5/1995 | Tuckey | .......... 123/509 |
| 5,647,329 A | * | 7/1997 | Bucci et al. | ........... 123/509 |
| 5,728,292 A | * | 3/1998 | Hashimoto et al. | .......... 210/136 |
| 6,079,581 A | * | 6/2000 | Hashimoto et al. | .......... 220/86.2 |
| 6,231,318 B1 | * | 5/2001 | Cotton et al. | ............. 417/423.1 |
| 6,706,183 B2 | * | 3/2004 | Ito et al. | ..................... 210/416.1 |
| 6,942,787 B2 | * | 9/2005 | Robinson et al. | ............... 210/97 |
| 7,029,582 B2 | * | 4/2006 | Sato et al. | ..................... 210/232 |

FOREIGN PATENT DOCUMENTS

| | | |
|---|---|---|
| DE | 3711479 A1 | 10/1988 |
| DE | 10119892 A1 | 11/2002 |
| DE | 102006039355 A1 | 3/2008 |
| EP | 0781973 A | 7/1997 |

* cited by examiner

Primary Examiner — Joseph Drodge

(74) Attorney, Agent, or Firm — Mark A. Ussai; Bryan Peckjian

(57) ABSTRACT

A cover device includes a cover plate having at least one recessed section defining an internal volume. A separating element is inserted in the recessed section and delimits the internal volume. The separating element is configured to permit the internal volume to fluidly communicate through the separating element. At least an edge portion of the cover plate is provided with a sealing element for abutment on an opposing surface of a structure to be sealed by the cover device. The sealing element is disposed at least along an edge of the recessed section and fixedly connects the cover plate with the separating element in a sealed manner.

20 Claims, 1 Drawing Sheet

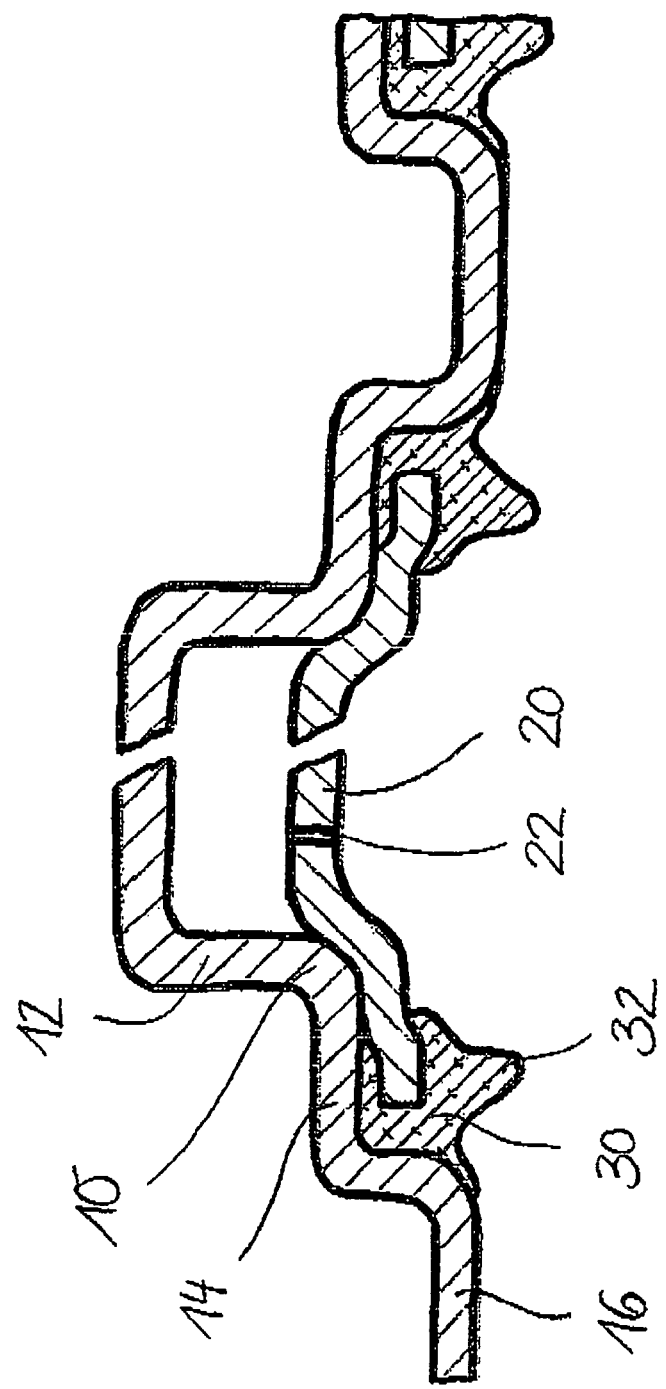

COVER WITH INTEGRAL SEAL

CROSS-REFERENCE TO RELATED APPLICATIONS

The present application claims priority to German patent application no. 10 2008 051 856.5 filed Oct. 17, 2008, the contents of which are incorporated fully herein by reference.

BACKGROUND OF THE INVENTION

The present disclosure generally concerns a cover having an integral seal, which may, e.g., be utilized in a valve manifold.

A known cover for a valve manifold of an electro-hydraulic valve control system of an internal combustion engine includes equalization chambers that permit volume equalization for oil expelled from the valves at high pressure. In such a cover, the oil can enter and leave only through a defined flow-through cross section in the equalization chambers. The equalization chambers are enclosed by a connection plate having at least one aperture that enables the oil to communicate across the connection plate. The cover is then connected with the valve manifold by means of a liquid sealant and/or a metal gasket in a manner that prevents oil from leaking between the cover and an opposing, contacting surface of the valve manifold.

However, there is still a long-felt need in the art for a cover with a seal that has an improved interconnection and/or cohesion of the respective individual components.

SUMMARY OF THE INVENTION

In one aspect of the present teachings, a cover includes a cover plate having at least one recessed section defining an internal volume. A separator is disposed in and at least substantially separates the internal volume into a first internal space and a second internal space. The separator also includes means for enabling fluid communication between the first and second internal spaces and through the separator. A seal is disposed at least along an edge portion of the recessed section and connects the cover plate with the separating element. The seal is preferably configured to sealingly abut on an opposing surface of a structure to be covered.

In another aspect of the present teachings, a cover includes a cover element having at least one bowl- or pot-shaped section. A separating element is inserted in the bowl- or pot-shape and delimits a volume of the bowl- or top-shape. The separating element comprises a means for connecting the delimited volume to a volume bounded by an opposing surface, on which opposing surface at least the edge of the cover element is intended for sealing abutment. A sealing element is disposed at least along an edge of the bowl- or top-shape section and connects the cover element with the separating element, preferably in one of a permanent, undetachable or fixed manner.

Thus, modules are provided according the present teachings, in which the cover element, the separating element and the sealing element form an integral structural unit that is preferably held together in an undetachable manner. For this purpose, the sealing element may assume a dual function; e.g., it may serve to seal the cover element relative to the opposing surface while also fixedly connecting the separating element with the cover element.

As compared to known covers comprising several individual components, a device according to the present teachings preferably simplifies assembly, thereby contributing, among other things, to reduced manufacturing costs, especially if the cover element and the separating element are constructed as deep-drawn steel-plate components and the sealing element is made from sprayed-on or injection-molded elastomer material.

In addition or in the alternative, if the sealing element is an integral component of the unit, a secure seal is automatically generated when the sealing element is formed. This is particularly advantageous in case the cover is utilized in an application, such as the above-noted valve manifold or valve block application, in which the internal space(s) defined, in part, by the cover element should remain hermetically sealed from the outside environment during operation (e.g., cooling of the entire valve system).

Further advantages, features and details of the present teachings are derivable from the following description of an exemplary embodiment in view of the FIGURE.

BRIEF DESCRIPTION OF THE SEVERAL VIEWS OF THE DRAWINGS

The sole FIGURE depicts a representative cover according to the present teachings.

DETAILED DESCRIPTION OF THE INVENTION

The FIGURE shows a longitudinal section through the representative covering device in a cut-out and partially discontinuous manner. The covering device comprises a cover element (plate) 10 having at least one bowl- or pot-shaped section 12. The section 12 may also have any another shape that defines a recess and thus an internal volume therein. The outer edge portion of the pot-shaped section 12 also defines a recess and the outer edge portion may be formed by twice outwardly bending it. In this case, a first punched disk-like portion 14 results as an attachment surface for a separating element (separator) 20 and a second punched disk-like portion 16 results for abutment on an opposing surface, on which the covering device is intended to abut in a sealed manner.

The separating element 20 is inserted into the pot-shaped section 12 and delimits the internal volume of the pot-shape section. The separating element 20 comprises at least one aperture 22, through which the separated volumes can fluidly communicate via a defined flow-through cross-section. An edge or outer portion of the separating element 20 is designed such that it abuts in a close-fit manner on the first punched disk-like portion 14 as well as on the junction portion between the first punched disk-like portion 14 and the cylindrical wall of the pot-shape. Furthermore, the edge or outer portion of the separating element 20 is designed to be axially and radially spaced from the cover element 12.

In order to sealingly connect the cover element 10 with the separating element 20, the cover element 10 may be, e.g., inserted into an injection mold with the separating element 20 inserted or disposed in the cover element 10. Then, a sealing element (seal) 30, e.g., as shown in the FIGURE, is produced by an injection mold process. Because an axially- and radially-extending space exists between the outer edge or portion of the separating element 20 and the cover element 10, the sealing element 30 entirely surrounds the outer edge of the separating element 20 and securely retains the separating element 20 on the cover element 10. An appropriate adhesion agent, e.g., may be applied to the corresponding surfaces of the cover element 10 in order to ensure that the sealing element 30 firmly adheres to the cover element 10.

The sealing element 30 is preferably produced by injection molding such that it forms, as indicated in the FIGURE, a downwardly-projecting, radially-encircling sealing lip 32. That is, the lip 32 preferably is endless and may have, e.g., a circular, oval or polygonal shape. The lip 32 preferably serves as a seal when the covering device is pressed against an opposing surface and is correspondingly deformed, thereby ensuring a gas-tight and liquid-tight seal between the opposing surface and the covering device.

In further representative manufacturing embodiments, an adhesive agent may be applied to the surface portions of the separating element 20 contacted by the sealing element 30 prior to being placed in a vulcanization and/or an injection molding machine. In addition or in the alternative, the respective surfaces portions, where the cover element 10 contacts the separating element 20 and/or where a very thin elastomer layer forms when an elastomer material for forming the sealing element 30 is injected between the two adjacent surfaces of the cover- and separating elements 10 and 20, may be coated with an adhesive agent prior to injection molding. The adhesive agent on two mutually-opposing surfaces may, in certain embodiments, directly react and bond with each other in order to produce a secure connection of the cover element 10 with the separating element 20 via the adhesive agent (i.e. without intervening elastomer material) and/or via the very thin elastomer layer.

The elastomer may be a thermoset elastomer. In this case, the injection molding process may be, e.g., performed at an elevated temperature of, e.g., 190° C. and an elevated pressure of, e.g., about 400 bar. A vulcanization process is then preferably performed thereafter.

In the alternative, the elastomer may be a thermoplastic elastomer that does not require vulcanization.

Preferred elastomers include, but are not limited to, polyacrylate rubber (ACM) and acrylonitrile butadiene rubber (NBR). Suitable adhesive agents can be selected based upon the respective compositions of the sealing element 30, the cover element 10 and the separating element 20.

In alternate embodiments, the covering device may comprise two or more of the above-described pot-shaped sections 12, as this is indicated in the right portion of the FIGURE, wherein one or more of pot-shaped sections 12 may be equipped with a separating element 20 and a sealing element 30, as was described above.

The cover element 10 and separating element 20 are preferably comprised of a metal or metal alloy, such as steel, although one or both of these structures may be made of a plastic material in certain embodiments of the present teachings.

The present covering devices may be advantageously utilized in valve manifolds or valve blocks, e.g., for internal combustion engines, although the present teachings are widely applicable to any application where a cover having a delimited internal space it intended to be sealingly connected to another structure.

I claim:

1. A device comprising:
a cover element having at least one bowl- or pot-shaped section, wherein at least an edge portion of said section is provided with a sealing element configured to abut on an opposing surface in a sealed manner, and
a separating element inserted in the bowl- or pot-shape section, the separating element delimiting an internal volume of the bowl- or top-shape section and comprising a means for permitting the delimited volume to fluidly communicate with a volume that is at least partially bounded by the opposing surface,
wherein the sealing element is disposed at least along or adjacent the edge portion of the bowl- or top-shape section and fixedly connects the cover element with the separating element, and the sealing element comprises a circumferential sealing lip projecting from the edge portion and past the separating element.

2. A device according to claim 1, wherein the fluid communication permitting means comprises at least one aperture having a defined cross-section and extending through the separating element.

3. A device according to claim 2, wherein at least one of the cover element and the separating element is a deep-drawn steel plate part.

4. A device according to claim 1, wherein the circumferential sealing lip projects toward and is configured to abut the opposing surface.

5. A device according to claim 1, wherein the sealing element is produced by at least one of injection molding and spraying a molding material onto the cover element with the separating element is inserted therein.

6. A device according to claim 5, wherein the sealing element comprises elastomer material.

7. A device according to claim 1, wherein an outer edge of the separating element is axially and radially spaced from the cover element, such that the sealing element entirely surrounds the outer edge of the separating element.

8. A device according to claim 1, wherein the edge of the bowl- or pot-shape section comprises a first punched disk-shaped portion configured as an attachment surface for the separating element and a second punched disk-shaped portion configured to face the opposing surface.

9. A device according to claim 8, wherein the separating element is configured to abut on the first punched disk-shaped portion as well as on a junction between the first punched disk-shaped portion and a cylindrical wall of the bowl- or pot-shape section.

10. A device according to claim 1, wherein the cover element comprises a plurality of bowl- or pot-shaped sections, in each of which one respective sealing element connects one respective separating element with the respective bowl- or pot-shaped section.

11. A device according to claim 3, wherein:
the circumferential sealing lip is injection-molded and projects toward the opposing surface, the sealing element comprising elastomer material,
an outer edge of the separating element is axially and radially spaced from the cover element, such that the sealing element entirely surrounds the outer edge of the separating element,
the edge of the bowl- or pot-shape section comprises a first punched disk-shaped portion configured as an attachment surface for the separating element and a second punched disk-shaped portion configured to face the opposing surface, and
the separating element is configured to abut on the first punched disk-shaped portion as well as on a junction between the first punched disk-shaped portion and a cylindrical wall of the bowl- or pot-shape section.

12. A cover comprising:
a cover plate having at least one recessed section defining an internal volume,
a separator disposed in and at least substantially separating the internal volume into a first internal space and a second internal space, the separator including means for enabling the first and second internal spaces to fluidly communicate through the separator, and
a seal disposed at least along or adjacent an edge portion of the recessed section and fixedly connecting the cover plate with the separator in a sealed manner, wherein the seal comprises an endless sealing lip projecting from the edge portion of the cover plate and past the separator.

13. A cover according to claim 12, wherein the means for enabling fluid communication comprises at least one aperture extending through the separator.

14. A cover according to claim 13, wherein the endless sealing lip projects substantially perpendicularly relative to the edge portion of the cover plate.

15. A cover according to claim 14, wherein the seal is an injection-molded elastomer material.

16. A cover according to claim 14, wherein an outer edge of the separator is axially and radially spaced from the cover plate, such that the seal entirely surrounds the outer edge of the separator.

17. A cover according to claim 16, wherein the cover plate comprises a first outer portion configured to attach to the separator and a second outer portion configured to abut another structure to be hermetically sealed by the cover.

18. A cover according to claim 17, wherein the separator abuts the first outer portion as well as an adjacent junction of the first outer portion with a cylindrical wall that at least partially defines the internal volume.

19. A cover according to claim 12, wherein the cover plate comprises a first outer portion configured to attach to the separator and a second outer portion configured to abut another structure to be hermetically sealed by the cover and wherein the separator abuts the first outer portion as well as an adjacent junction of the first outer portion with a cylindrical wall that at least partially defines the internal volume.

20. A cover according to claim 12, wherein the cover plate comprises a plurality of recessed portions, in each of which one respective separator is fixedly connected via a respective seal.

* * * * *